(12) United States Patent
Gregg et al.

(10) Patent No.: US 6,343,841 B1
(45) Date of Patent: Feb. 5, 2002

(54) SEAT BELT EXTENSION

(76) Inventors: Robert W. Gregg, 1520 Orange Rd., Lot #83; Richard M. Koch, 1325 County Rd. 1153, both of Ashland, OH (US) 44805

( * ) Notice: Subject to any disclaimer, the term of this patent is extended or adjusted under 35 U.S.C. 154(b) by 0 days.

(21) Appl. No.: 09/434,807

(22) Filed: Nov. 5, 1999

(51) Int. Cl.[7] .......................... A62B 35/00; B60R 21/00; B60R 22/12
(52) U.S. Cl. .......................... 297/468; 297/464; 297/468
(58) Field of Search .................... 297/468, 470, 297/471, 483, 488, 464; 280/801.2, 805

(56) References Cited

U.S. PATENT DOCUMENTS

| | | |
|---|---|---|
| 1,268,075 A | 5/1918 | Glynn |
| 4,243,028 A | 1/1981 | Puyana |
| 4,919,484 A | 4/1990 | Bougher et al. |
| 5,248,187 A * | 9/1993 | Harrison .................. 297/468 X |
| 5,292,181 A * | 3/1994 | Dybro .......................... 297/468 |
| 5,443,302 A | 8/1995 | Dybro .......................... 297/471 |
| D393,337 S | 4/1998 | Seki |
| 5,795,030 A | 8/1998 | Becker .................... 297/468 X |

* cited by examiner

*Primary Examiner*—Peter M. Cuomo
*Assistant Examiner*—Rodney B. White

(57) ABSTRACT

A seat belt extension for extending a seat belt while preventing twisting of the seat belt. The seat belt extension includes a first elongate panel having a first end, a second end and a middle portion. The first panel has a generally rectangular configuration. A second elongate panel has four edges, wherein a first, a second and a third of the edges are fixedly secured to the first panel. A pocket is formed between the second panel and the first panel. An insert is inserted in the pocket between the first panel and the second panel. A female portion of a seat belt buckle is fixedly coupled to the first end of the first panel. A male portion of a seat belt buckle, the male portion is fixedly coupled to the second end of the first panel.

10 Claims, 2 Drawing Sheets

SEAT BELT EXTENSION

BACKGROUND OF THE INVENTION

1. Field of the Invention

The present invention relates to belt extensions and more particularly pertains to a new seat belt extension for extending a seat belt while preventing twisting of the seat belt.

2. Description of the Prior Art

The use of belt extensions is known in the prior art. More specifically, belt extensions heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. Des. 352,591; U.S. Pat. No. 5,248,187; U.S. Pat. No. 4,796,915; U.S. Pat. No. 3,074,761; U.S. Pat. No. 5,135,257; U.S. Pat. No. 5,080,396; U.S. Pat. No. 5,570,333; U.S. Pat. No. 5,795,030; U.S. Pat. No. 4,919,848; U.S. Pat. No. 4,243,028; U.S. Pat. No. 5,443,302; U.S. Pat. No. 1,268,075; and U.S. Patent Des. No. 393,337.

While these devices fulfill their respective, particular objectives and requirements, the aforementioned patents do not disclose a new seat belt extension. The inventive device includes a first elongate panel having a first end, a second end and a middle portion. The first panel has a generally rectangular configuration. A second elongate panel has four edges, wherein a first, a second and a third of the edges are fixedly secured to the first panel. A pocket is formed between the second panel and the first panel. An insert is inserted in the pocket between the first panel and the second panel. A female portion of a seat belt buckle is fixedly coupled to the first end of the first panel. A male portion of a seat belt buckle, the male portion is fixedly coupled to the second end of the first panel.

In these respects, the seat belt extension according to the present invention substantially departs from the conventional concepts and designs of the prior art, and in so doing provides an apparatus primarily developed for the purpose of extending a seat belt while preventing twisting of the seat belt.

SUMMARY OF THE INVENTION

In view of the foregoing disadvantages inherent in the known types of belt extensions now present in the prior art, the present invention provides a new seat belt extension construction wherein the same can be utilized for extending a seat belt while preventing twisting of the seat belt.

The general purpose of the present invention, which will be described subsequently in greater detail, is to provide a new seat belt extension apparatus and method which has many of the advantages of the belt extensions mentioned heretofore and many novel features that result in a new seat belt extension which is not anticipated, rendered obvious, suggested, or even implied by any of the prior art belt extensions, either alone or in any combination thereof.

To attain this, the present invention generally comprises a first elongate panel having a first end, a second end and a middle portion. The first panel has a generally rectangular configuration. A second elongate panel has four edges, wherein a first, a second and a third of the edges are fixedly secured to the first panel. A pocket is formed between the second panel and the first panel. An insert is inserted in the pocket between the first panel and the second panel. A female portion of a seat belt buckle is fixedly coupled to the first end of the first panel. A male portion of a seat belt buckle, the male portion is fixedly coupled to the second end of the first panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new seat belt extension apparatus and method which has many of the advantages of the belt extensions mentioned heretofore and many novel features that result in a new seat belt extension which is not anticipated, rendered obvious, suggested, or even implied by any of the prior art belt extensions, either alone or in any combination thereof.

It is another object of the present invention to provide a new seat belt extension which may be easily and efficiently manufactured and marketed.

It is a further object of the present invention to provide a new seat belt extension which is of a durable and reliable construction.

An even further object of the present invention is to provide a new seat belt extension which is susceptible of a low cost of manufacture with regard to both materials and labor, and which accordingly is then susceptible of low prices of sale to the consuming public, thereby making such seat belt extension economically available to the buying public.

Still yet another object of the present invention is to provide a new seat belt extension which provides in the apparatuses and methods of the prior art some of the advantages thereof, while simultaneously overcoming some of the disadvantages normally associated therewith.

Still another object of the present invention is to provide a new seat belt extension for extending a seat belt while preventing twisting of the seat belt.

Yet another object of the present invention is to provide a new seat belt extension which includes a first elongate panel having a first end, a second end and a middle portion. The first panel has a generally rectangular configuration. A second elongate panel has four edges, wherein a first, a second and a third of the edges are fixedly secured to the first panel. A pocket is formed between the second panel and the first panel. An insert is inserted in the pocket between the first panel and the second panel. A female portion of a seat belt buckle is fixedly coupled to the first end of the first panel. A male portion of a seat belt buckle, the male portion is fixedly coupled to the second end of the first panel.

Still yet another object of the present invention is to provide a new seat belt extension that has a removable insert for easy storage.

Even still another object of the present invention is to provide a new seat belt extension that can be easily adapted for any female or male belt buckle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
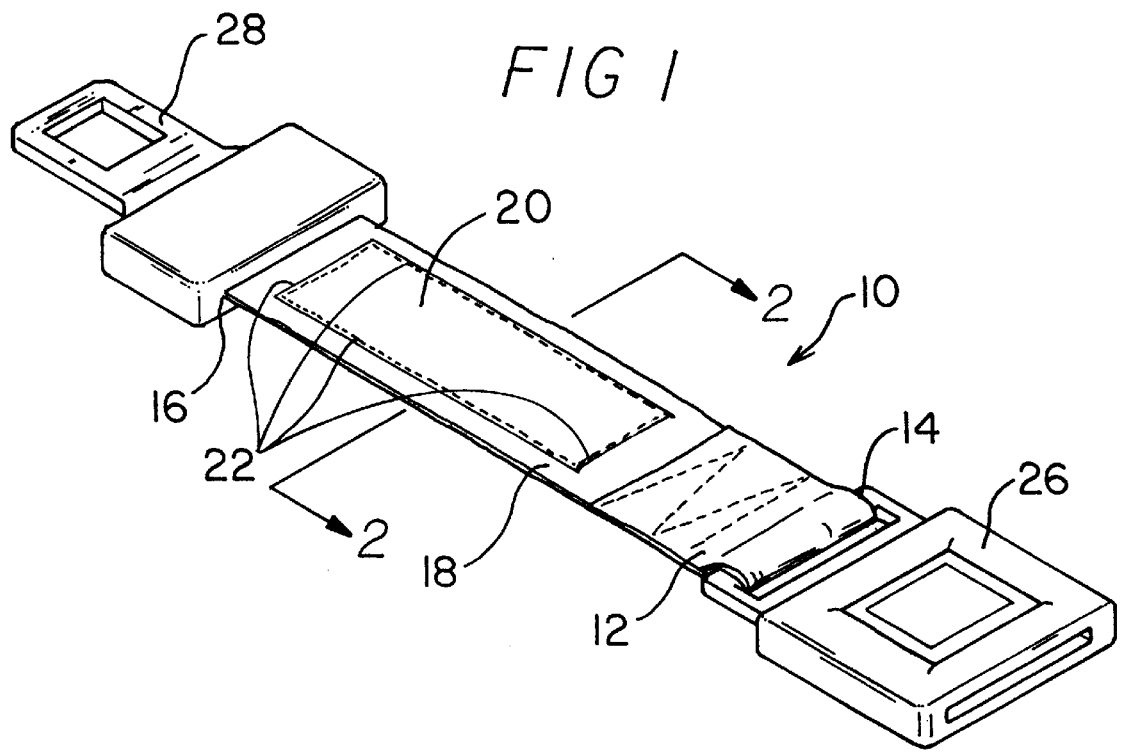
FIG. 1 is a schematic perspective view of a new seat belt extension according to the present invention.
Figure 2:
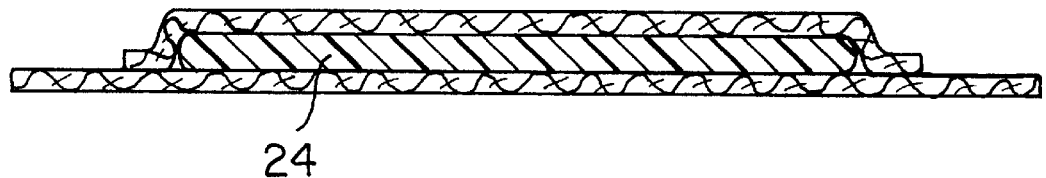
FIG. 2 is a schematic cross-sectional view along line 2—2 of the present invention showing the insert.
Figure 3:
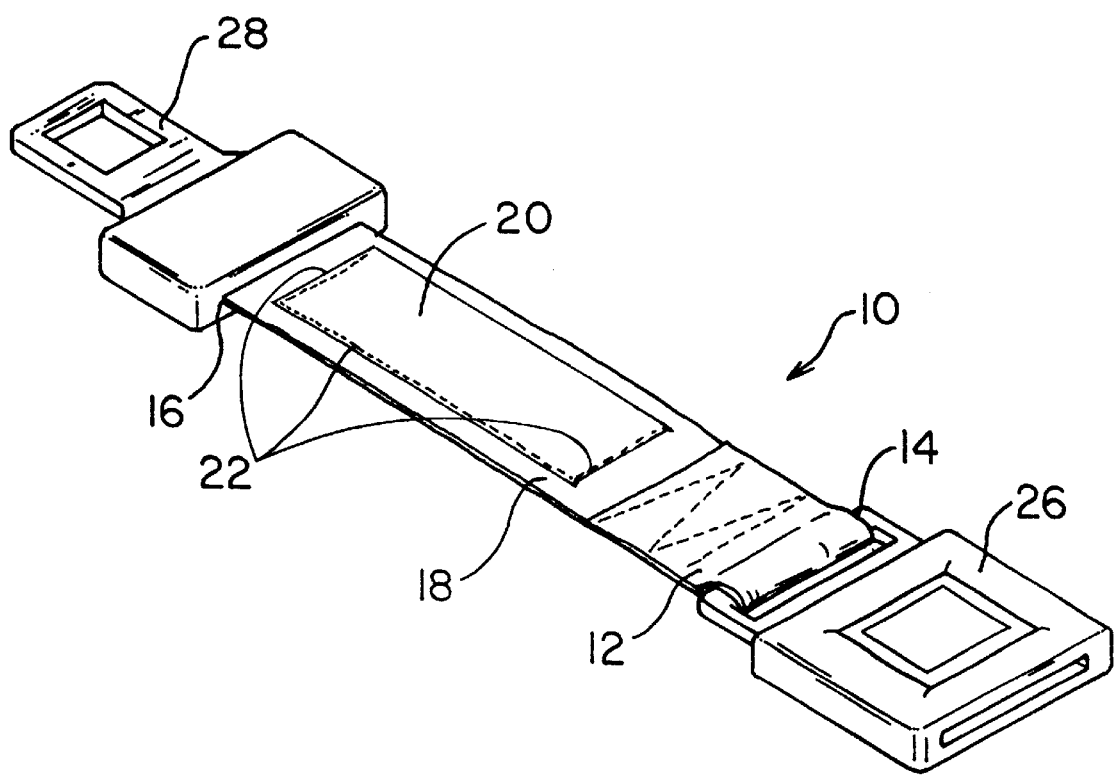
FIG. 3 is a schematic perspective view of an embodiment of the invention having an optional second panel structure.

With reference now to the drawings, and in particular to FIGS. 1 through 3 thereof, a new seat belt extension embodying the principles and concepts of the present invention and generally designated by the reference numeral 10 will be described.

As best illustrated in FIGS. 1 and 2, the seat belt extension 10 generally comprises a first panel 12, the first panel is elongate and has a first end 14, a second end 16 and a middle portion 18. Preferably, the first panel has a generally rectangular configuration. Also preferably, the first panel is comprised of cloth. The cloth can be selected from any suitably material although cotton or synthetic fibers such as polyester are preferred.

A second elongate panel 20 is fixedly coupled to the first panel. The second panel has four edges 22. In a second embodiment, only three of the panels are secured to the first panel. In the preferred embodiment, each of the edges 22 is fixedly secured to the first panel 12, wherein a pocket is formed between the second panel 20 and the first panel 12. The second panel 20 is located generally in the middle portion 18 of the first panel 12. Preferably, the second panel 20 has a length greater than one-half a length of the first panel 12. Ideally, the second panel 20 has a width greater than one-half a width of the first panel 12.

An insert 24 is inserted in the pocket between the first panel 20 and the second panel 12. In the second embodiment, the insert 24 is removable for ease of storage. Preferably, the insert 24 is resiliently flexible and the insert has a generally rectangular shape. The insert 24 ideally has a length and width substantially equal to a length and width of the pocket. Preferably, the insert 24 is formed from the group consisting metal or plastic. The insert 24 resists bunching and twisting of the first 12 and second panels 20.

A female portion 26 of a seat belt buckle is fixedly coupled to the first end 14 of the first panel. A male portion 18 of a seat belt buckle is fixedly coupled to the second end 16 of the first panel.

In use, a seat belt is extended by inserting the device between the seat belt buckle of the seat belt by way of the female 26 and male 28 seat belt buckle attachments. The insert 24 stabilizes the device 10 from twisting which may happen due to an extending length of the seat belt. By not twisting, the extension device 10 remains more comfortable than it would be otherwise.

Other embodiments of the invention include modified male and female belt buckle portions so that the device may be used with any seat belt configuration.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A device for extending the effective length of a seat belt, said device comprising:

an elongate first panel having a first end, a second end and a middle portion, said first panel having a generally rectangular configuration;

an elongate second panel having four sides, a first, a second and a third of said sides being fixedly secured to said first panel, a fourth of said sides being substantially free of connection to said first panel such that a pocket is formed between said second panel and said first panel;

an insert removably inserted in said pocket between said first panel and said second panel;

a female portion of a seat belt buckle adapted to be removably matable to a male portion of a seat belt buckle of a vehicle, said female portion being fixedly coupled to said first end of said first panel; and a male portion of a seat belt buckle adapted to be removably matable to a female portion of a seat belt buckle of a vehicle, said male portion being fixedly coupled to said second end of said first panel.

2. The device for extending the effective length of a seat belt as defined in claim 1, wherein said second panel is located generally in said middle portion of said first panel, said second panel having a length greater than one-half a length of said first panel, said second panel having a width greater than one-half a width of said first panel.

3. The device for extending the effective length of a seat belt as defined in claim 1, wherein said insert is resiliently flexible, said insert having a generally rectangular shape, said insert having a length and width substantially equal to a length and width of said pocket, said insert being formed from material selected from the group consisting of a metal and a plastic, wherein said insert resists bunching and twisting of said first and second panels.

4. The device for extending the effective length of a seat belt as defined in claim 1, wherein said second panel is located generally in said middle portion of said first panel.

5. The device for extending the effective length of a seat belt as defined in claim 1, wherein said second panel has a length greater than one-half a length of said first panel, said second panel having a width greater than one-half a width of said first panel.

6. The device for extending the effective length of a seat belt as defined in claim 1, wherein said insert is resiliently flexible, said insert resisting bunching and twisting of said first and second panels.

7. The device for extending the effective length of a seat belt as defined in claim 1, wherein said insert has a perimeter with a generally rectangular shape.

8. The device for extending the effective length of a seat belt as defined in claim 1, wherein said insert has a length and width substantially equal to a length and width of said pocket.

9. The device for extending the effective length of a seat belt as defined in claim 1, wherein said insert has first and second planar faces, said first and second planar faces being oriented substantially parallel to each other.

10. A device for extending the effective length of a seat belt, said device comprising:

an elongate first panel having a first end, a second end and a middle portion, said first panel having a generally rectangular configuration;

an elongate second panel having four sides, a first, a second and a third of said sides being fixedly secured to said first panel, a fourth of said sides being substantially free of connection to said first panel such that a pocket is formed between said second panel and said first panel;

an insert removably inserted in said pocket between said first panel and said second panel;

a female portion of a seat belt buckle adapted to be removably matable to a male portion of a seat belt buckle of a vehicle, said female portion being fixedly coupled to said first end of said first panel; and a male portion of a seat belt buckle adapted to be removably matable to a female portion of a seat belt buckle of a vehicle, said male portion being fixedly coupled to said second end of said first panel;

wherein said second panel is located generally in said middle portion of said first panel, said second panel having a length greater than one-half a length of said first panel, said second panel having a width greater than one-half a width of said first panel;

wherein said insert is resiliently flexible, said insert having a generally rectangular shape, said insert having a length and width substantially equal to a length and width of said pocket, said insert being formed from material selected from the group consisting of a metal and a plastic, wherein said insert resists bunching and twisting of said first and second panels;

wherein said second panel is located generally in said middle portion of said first panel;

wherein said second panel has a length greater than one-half a length of said first panel, said second panel having a width greater than one-half a width of said first panel;

wherein said insert is resiliently flexible, said insert resisting bunching and twisting of said first and second panels;

wherein said insert has a perimeter with a generally rectangular shape;

wherein said insert has a length and width substantially equal to a length and width of said pocket;

wherein said insert has first and second planar faces, said first and second planar faces being oriented substantially parallel to each other.

\* \* \* \* \*